United States Patent [19]

Evdokimo

[11] Patent Number: 5,174,266
[45] Date of Patent: Dec. 29, 1992

[54] FUEL TEMPERATURE CONTROL DEVICE WITH THERMOELECTRIC MODULES

[76] Inventor: Allen J. Evdokimo, 1819 Grand Point Way, Reno, Nev. 89523

[21] Appl. No.: 814,851

[22] Filed: Dec. 30, 1991

[51] Int. Cl.⁵ .......................................... F02M 31/00
[52] U.S. Cl. ................................. 123/557; 123/552
[58] Field of Search ............ 123/552, 557, 549, 545, 123/546, 547

[56] References Cited

U.S. PATENT DOCUMENTS

| | | | |
|---|---|---|---|
| 2,748,758 | 6/1956 | Fairbanks | 123/557 |
| 3,868,939 | 4/1975 | Friese et al. | 123/557 |
| 4,072,138 | 2/1978 | Hawkins et al. | 123/557 |
| 4,180,036 | 12/1979 | Wolf | 123/557 |
| 4,187,813 | 2/1980 | Stumpp | 123/557 |
| 4,259,937 | 4/1981 | Elliott | 123/557 |
| 4,377,149 | 3/1983 | Naylor et al. | 123/557 |
| 4,387,291 | 6/1983 | Keppel | 123/557 |
| 4,679,539 | 7/1987 | Storbakken | 123/557 |
| 4,722,314 | 2/1988 | Martinson | 123/557 |
| 4,933,077 | 6/1990 | Wolf | 123/557 |
| 4,934,330 | 6/1990 | Lindsay | 123/557 |
| 5,038,742 | 8/1991 | Uddin | 123/549 |
| 5,048,501 | 9/1991 | Smith et al. | 123/557 |

Primary Examiner—Noah P. Kamen
Attorney, Agent, or Firm—Townsend & Townsend

[57] ABSTRACT

A fuel temperature control system maintains fuel at a programmable temperature by adding heat to or drawing heat from the fuel as it passes through a heat exchanger. A secondary heat exchanger is used in conjunction with Peltier-effect thermoelectric modules to perform the addition of extraction of heat. A control unit receives fuel temperature signals and generates module electrical control signals to control the amount and direction of heat transfer.

21 Claims, 4 Drawing Sheets

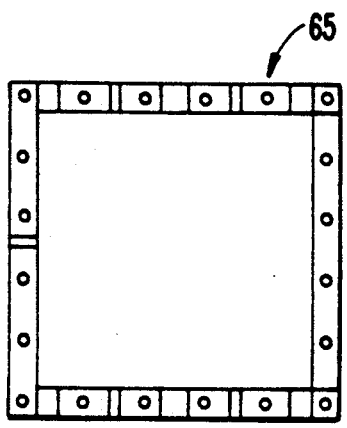
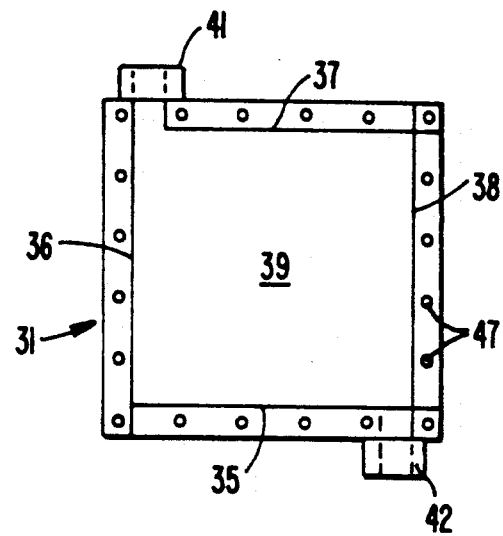
FIG. 7.
FIG. 5.
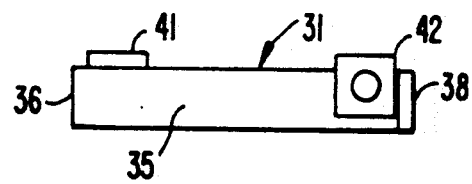
FIG. 8.
FIG. 6.

FUEL TEMPERATURE CONTROL DEVICE WITH THERMOELECTRIC MODULES

BACKGROUND OF THE INVENTION

This invention relates to devices for heating fuel prior to distribution by carburetion or fuel injection.

Many devices are known which are used to heat a fuel such as gasoline prior to carburetion or fuel injection into an engine. In a typical device, fuel supplied from a fuel tank by a pump is passed through a heat exchanger to raise the temperature of the fuel prior to the introduction of the fuel into the carburetor or fuel injection system. The purpose for heating the fuel is to improve the efficiency with which the fuel is combusted and, in some cases, to decrease the viscosity of the fuel. The prior art heat exchangers have included secondary fluid type heat exchangers which rely on the flow of a secondary fluid, such as engine coolant, to transfer heat into the fuel, and electrically operated thermal heating elements used to heat the fluid passage walls through which the fluid flows. Examples of such devices are described in U.S. Pat. No. 4,072,138 and 4,259,937, the disclosures of which are hereby incorporated by reference.

In order to be suitable for use, fuel heating devices must be relatively compact and easy to install as either an original system item or as an after-market accessory item, and must be compatible with a wide variety of existing fuel installations. In addition, such fuel heating devices must also be capable of raising the fuel to an operating temperature and maintaining that fuel temperature over a wide range of operating environments and environmental temperatures. Efforts to date to devise a fuel temperature control system having all of the above characteristics have not met with wide success.

SUMMARY OF THE INVENTION

The invention comprises a fuel temperature control system, and a fuel temperature control device for use with such a system, which is compatible with all existing fuel installations, compact, easy to install and relatively inexpensive, and which is capable of maintaining the fuel temperature at a prescribed temperature.

From a broad aspect, the invention comprises a fuel temperature control system for maintaining the temperature of a fuel at a programmable temperature within a predetermined range, the system including a fuel source, a fuel distribution element such as a carburetor or fuel injection system for an internal combustion engine, a fuel temperature control device, and a control unit for operating the fuel temperature control device.

The fuel temperature control device has a fuel heat exchange chamber with a fuel inlet coupled to the fuel source and a fuel outlet coupled to the fuel distribution device, a secondary heat exchange chamber with a secondary fluid inlet and a secondary fluid outlet coupled to a secondary fluid system, and a thermoelectric module in thermal contact with the two heat exchange chambers for transferring heat between the two chambers in order to maintain fuel flowing through the fuel heat exchange chamber at the programmed temperature. The thermoelectric module preferably comprises a substantially flat member having a first thermal transfer surface in thermal contact with the fuel exchange chamber and an opposite transfer surface in thermal contact with the secondary fluid heat exchange chamber. The thermoelectric module is preferably a Peltier-effect thermoelectric device which is bi-directional and capable of functioning as a thermoelectric heat pump so that heat can be added to the fuel or extracted from the fuel in order to maintain the exiting fuel at the proper temperature.

A temperature sensor is inserted into the fuel flow path, preferably adjacent the fuel outlet, in order to generate an electrical signal representative of the fuel temperature, the signal being supplied to the control unit. The control unit supplies DC control signals to the thermoelectric module for controlling the rate and direction of heat transfer.

From another standpoint, the invention comprises a fuel temperature control device having a cover with a top and a perimeter wall defining a partially enclosed volume, an inlet formed at one location in the perimeter wall, and an outlet formed at another location in the perimeter wall; and a base member having a base portion and a plurality of heat exchange members received within the partially enclosed volume and forming therein a fluid flow path between the inlet and the outlet, the base portion having an outer surface to which a plurality of thermoelectric modules are mechanically coupled. A pair of such fuel temperature control devices functions as the fuel and secondary fluid heat exchangers with the thermoelectric module positioned therebetween. A spacer surrounds the thermoelectric module to protect the module from excessive compressive forces when the two heat exchangers are fastened together.

The invention is quite compact and easy to assemble and mount, and is compatible with existing fuel installations. Further, the invention provides physically separated flow paths for the fuel and the secondary fluid, which eliminates any potential intermixing of the two.

For a fuller understanding of the nature and advantages of the invention, reference should be had to the ensuing detailed description taken in conjunction with the accompanying drawings.

BRIEF DESCRIPTION OF THE DRAWINGS

FIG. 5 is a plan view of the cover portion of the heat exchanger element;

FIG. 6 is an end elevational view of the cover of FIG. 6;

FIG. 7 is a plan view of the spacer element;

FIG. 8 is a side elevational view of the spacer element of FIG. 7;

DESCRIPTION OF THE PREFERRED EMBODIMENTS

Figure 1:
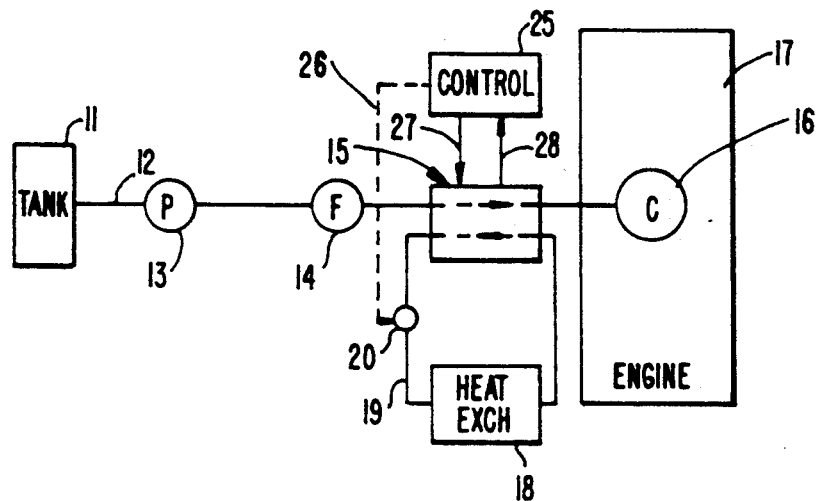
FIG. 1 is a schematic block diagram illustrating the invention.

Turning now to the drawings, FIG. 1 is a schematic diagram illustrating a first embodiment of the invention. As seen in this Figure, fuel from a fuel tank 11 is supplied via a fuel line 12, a conventional fuel pump 13 and a fuel filter 14 to the fuel inlet of a fuel temperature control device generally designated with reference numeral 15. After passing through the fuel temperature control device 15, temperature regulated fuel is supplied via the outlet of device 15 to a carburetor 16 of an internal combustion engine 17.

Fuel temperature control device 15 is provided with a secondary internal fluid flow path which is coupled to a secondary heat exchanger 18 by means of secondary fluid conduit 19 and a conventional pump 20.

Fuel temperature control device 15 includes a temperature sensor and an electrically controlled thermoelectric device, both of which are described more fully below, which are electrically coupled to a control unit generally designated with reference numeral 25 and depicted in block diagram form in FIG. 9. Control unit 25 controls the operation of the secondary fluid loop pump 20 and this functional capability is schematically depicted by broken line 26.

Figure 2:
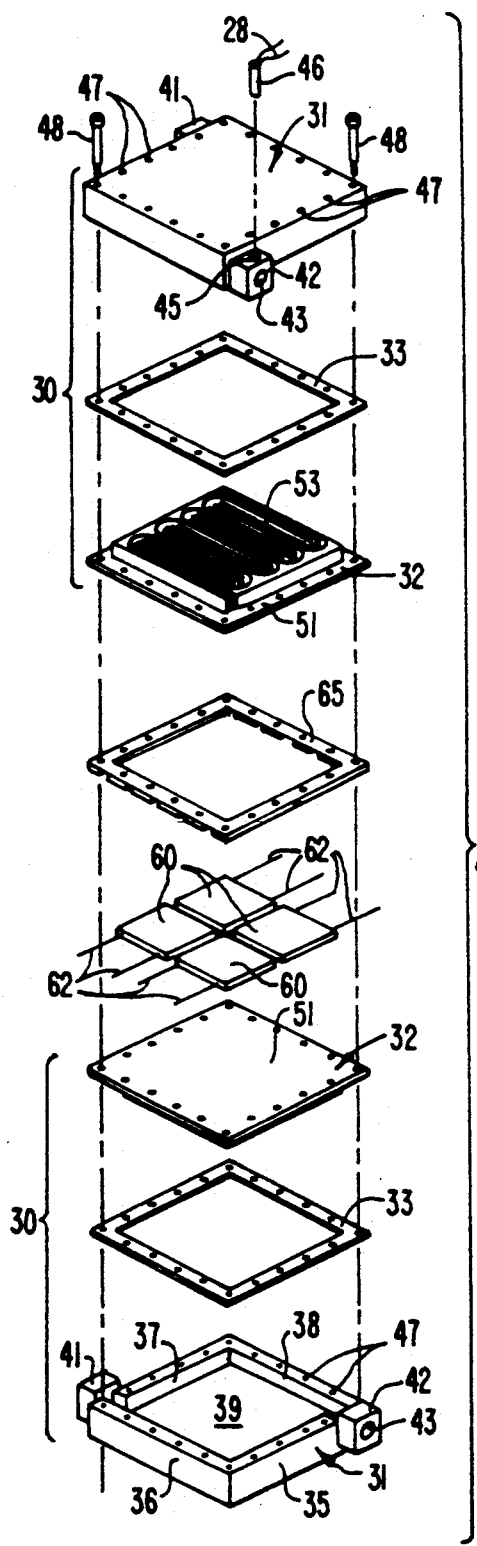
FIG. 2 is an exploded perspective view of the preferred embodiment of the fuel temperature control device.

As best seen in FIG. 2, fuel temperature control device 15 comprises a pair of essentially identical fluid heat exchangers 30 each comprising a cover 31, a base 32 and a gasket 33. Cover 31 is essentially a square member with four peripheral wall portions 35-38 which, together with the inside wall surface 39, define a partially enclosed volume. Cover 31 further includes a pair of outwardly extending portions 41, 42 each having a throughbore 43 for providing fluid communication with the interior of cover 31. Portions 41, 42 serve, respectively, as the inlet and the outlet portions for the respective heat exchangers 30. Outlet portion 42 is further provided with an additional bore 45 which intersects with throughbore 43. Bore 45 is designed to receive a suitable temperature sensor 46 for monitoring the temperature of the fuel exiting from the upper module 30. The perimeter of cover 31 is provided with a plurality of fastener apertures 47, preferably equally spaced along the periphery thereof, for receiving through fasteners 48 (only two of which are illustrated in FIG. 2). Fasteners 48 are designed to fasten together the entire assembly consisting of the upper and lower heat exchanger modules 30 and the intermediate elements to be described. For this purpose, the fastener apertures 47 in the cover member 31 in the lower heat exchanger module 30 may be internally tapped. In the alternative, the fastener holes 47 may be smooth bored, and appropriate fastener nuts may be employed, as desired.

Figure 3:
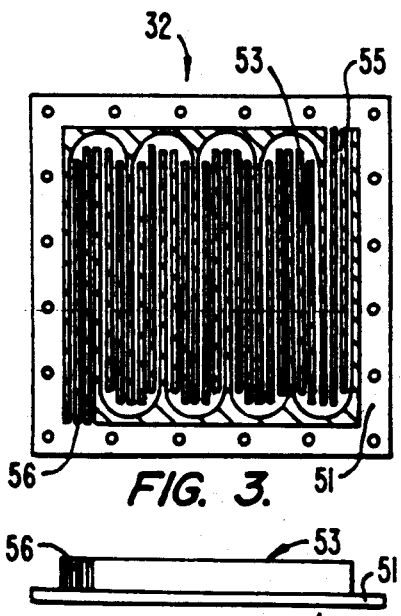
FIG. 3 is a top plan view of the base of the heat exchanger unit.
Figure 4:
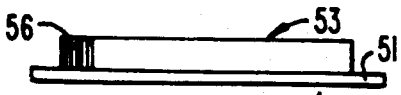
FIG. 4 is an end elevation view of the heat exchanger of FIG. 3.

Base 32 of each heat exchanger module includes an essentially flat base plate 51 and raised heat exchanger fins generally designated with reference numeral 53. As best seen in FIGS. 3 and 4, the heat exchanger fins 53 include an inlet portion 55, an outlet portion 56 and intermediate wall portions defining a serpentine path therebetween. Preferably, the base 32 is fabricated as a one piece unit by casting, machining from a billet, or the like. The material from which base 32 is fabricated is preferably a material with a relatively high coefficient of thermal conductivity, such as aluminum, copper, or alloys of either material that have high thermal conductivity.

Gasket 33 is used to seal the perimeter mating surfaces between cover 31 and base 32.

As shown in FIG. 2, secured between the facing surfaces of base members 32 are a plurality (four in the preferred embodiment) of thermoelectric modules 60. Each module 60 has a pair of conductive leads 62 which are coupled to control unit 25 via appropriate leads 27 (FIG. 1). Each module 60 is a thermoelectric device which operates on the Peltier principle and has anisotropic thermoelectric properties. Preferably, each module 60 is a type CP1.4-1.27-045L thermoelectric module available from Materials Electronic Products Corporation of Trenton, N.J., or equivalent. Such modules are known and are capable of bi-directional operation, depending on the direction of the DC current supplied to the terminals 62. In one direction, heat flows from the top surface illustrated in FIG. 2 to the bottom surface; in the other direction, heat flows from the bottom surface to the top. Each module is arranged in efficient thermal contact with the outer surfaces of base members 32 so as to provide efficient heat transfer between the upper and lower heat exchange modules 30. A mechanical spacer 65 protects the individual modules 30 from excessive compressive forces when the assembly is fastened together.

To assemble, the individual modules 60 are first bonded to one of the two base members 32 using a thin layer of a suitable thermally conductive adhesive, such as a heat transfer epoxy resin. The bonding adhesive should be as thin as possible in order to optimize the thermal contact between the outer surface of the module 60 and the outer surface of the base member 32. After bonding, spacer 65 is also bonded to the same base member 32 as the modules 60.

Next, the exposed surface of the spacer 65/module 60 subassembly is ground to a flat surface. Thereafter, a thin layer of epoxy is applied to the now-flat exposed surface of the modules 60 and spacer 65, after which the other base plate 32 is adhered. The assembly is completed by installing fasteners 48.

The now-assembled fuel temperature control device is now ready for connection to the fuel system and the secondary fluid loop in the manner shown in FIG. 1. Thus, the outlet of the fuel filter 14 is coupled to the inlet 41 of the upper module 30 in FIG. 2, while outlet 43 is coupled to the fuel distribution device (carburetor 16). The inlet 41 and outlet 42 of the secondary fluid heat exchanger (the lower module 30 in FIG. 2) are coupled to an appropriate heat exchange device 18, such as a small radiator, and a suitable secondary fluid is installed in the loop 19. One such suitable fluid is a 50-50 mixture of ethylene glycol and water: other suitable fluids will occur to those skilled in the art. Modules 60 are connected to the control unit 25 by means of conductive leads 62, and the temperature sensor is installed in bore 45 of the fuel heat exchanger cover 31. The temperature sensor is also connected to control unit 25 via conductive leads 28.

In use, as fuel is pumped through the fuel heat exchange chamber of the upper module 30 within fuel temperature control device 15, the temperature of the exiting fuel is monitored by the sensor, and a temperature signal is sent to control unit 25. So long as the temperature of the fuel is within a prescribed range, which is preferably ±2° F. of the programmed temperature, no control action is required. If the temperature of the fuel lies below this range control unit 25 generates a DC control signal of a first direction which is supplied to the individual thermoelectric modules 60 within device 15 via leads 27. In response to the DC signal, modules 60 transfer heat into the fuel from the secondary fluid heat exchanger (i.e., the lower module 30). This flow of heat (upwardly as viewed in FIG. 2) continues until the fuel reaches a temperature within the permitted range for the programmed temperature. If the fuel temperature as monitored by the sensor exceeds the upper limit of 2° F., control unit 25 generates a DC signal of opposite direction to cause the individual thermoelectric modules 60 to transfer heat out of the fuel and into the secondary heat exchanger fluid (downwardly in FIG. 2). This action continues until the temperature of the fuel is again within the prescribed permitted range for the programmed temperature.

Figure 9:
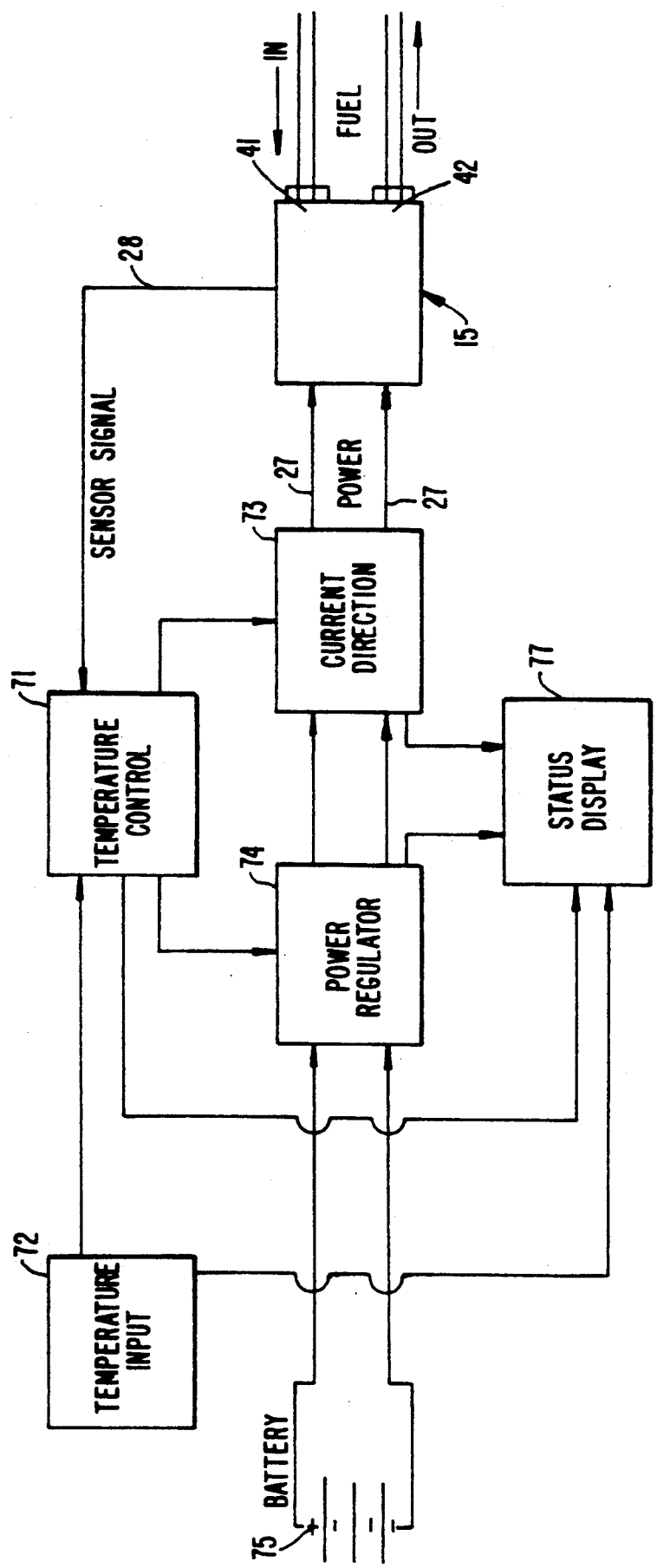
FIG. 9 is a block diagram of the central unit.

FIG. 9 shows a block diagram of control unit 25 illustrating the main elements. As seen in this FIG., fuel temperature signals from the sensor located in fuel temperature control device 15 are coupled via leads 28 to a temperature control circuit 71. Temperature control unit 71 compares the sensed fuel temperature with a programmed temperature setting supplied from a temperature input unit 72. Temperature input unit 72 may comprise any one of a number of suitable devices which enable the user to specify the desired fuel temperature setting, such as a keypad unit or a potentiometer. If the sensed fuel temperature is within the tolerance range permitted by unit 71, no temperature control action is required. If the sensed fuel temperature lies outside the tolerance range, unit 71 generates current direction and power signals, which are coupled to a current direction unit 73 and a power regulator 74. The output of the current direction unit 73 comprises the DC electrical control signals which are coupled to the modules 60 in device 15. The current direction unit 73 has as an input the output of the power regulator 74. The power regulator 74 receives power from a battery 75. Temperature control unit 71 also furnishes control signals to an optional status display unit 77 (which may comprise a dashboard mounted unit for displaying fuel temperature, electrical power consumption, or the like).

Figure 10:
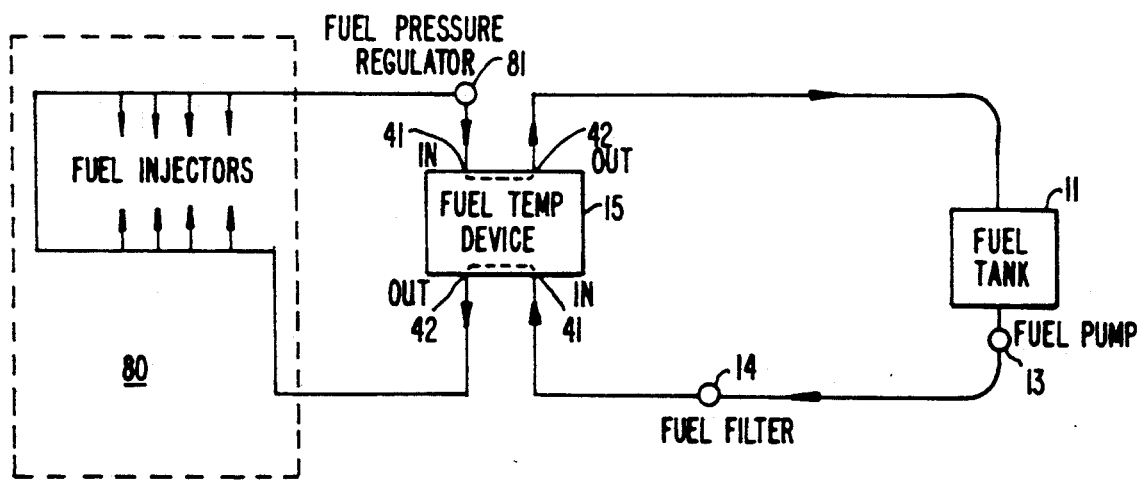
FIG. 10 is a schematic diagram of an alternate secondary fluid arrangement.

Although the invention has been described with reference to a secondary fluid loop including heat exchanger 18, closed loop 19 and pump 20, in some applications the secondary fluid loop heat exchanger 18 may not be necessary. FIG. 10 shows one such arrangement, in which the fuel temperature control device 15 is applied to a fuel injection system for an internal combustion engine. As seen in this FIG., the fuel from the fuel tank 11 is coupled to the inlet 41 of the fuel heat exchange module 30 in device 15, and the fuel outlet 42 is coupled to the fuel injection system generally designated with reference numeral 80. Unused fuel returns via a conventional fuel pressure regulator 81 and is coupled to the secondary fluid inlet 41 of the lower module 30 in device 15. The secondary fluid outlet 42 of the lower module 30 in device 15 is coupled as the return line to the fuel tank 11.

As will now be apparent, a fuel temperature control system fabricated according to the teachings of the invention affords several advantages. Firstly, the unit is extremely compact, and easy to assemble and install, even in limited space such as that encountered in many current internal combustion engine environments and applications. In addition, the fuel heat exchanger components (i.e., upper module 30 in FIG. 2) are completely separate from the secondary fluid heat exchanger elements (i.e., lower module 30 in FIG. 2): consequently, there is no danger that the fuel will become intermixed with the secondary fluid and vice versa. Further, by providing bi-directional heat pumping capability, not only can fuel be heated up to an optimal temperature, but also cooled down should the fuel become overheated. This bi-directional heat capability is extremely desirable in maintaining the fuel within the proper temperature range.

While the above provides a full and complete description of the preferred embodiments of the invention, various modifications, alternate constructions and equivalents will occur to those skilled in the art. For example, the control unit illustrated in FIG. 9 can also be used to control the amount of secondary fluid circulation provided by pump 20 (FIG. 1). Also, other types of secondary heat exchangers 18 may be employed, as desired. Therefore, the above should not be construed as limiting the invention, which is defined by the appended claims.

What is claimed is:

1. A fuel temperature control device comprising:
   a fuel heat exchange chamber with a fuel inlet and a fuel outlet;
   a secondary fluid heat exchange chamber with a secondary fluid inlet and a secondary fluid outlet; and
   a thermoelectric module in thermal contact with the two heat exchange chambers for transferring heat between said two heat exchange chambers to maintain fuel flowing through the fuel heat exchange chamber within a predetermined temperature range, said thermoelectric module having a first thermal transfer surface in thermal contact with said fuel heat exchange chamber and a second thermal transfer surface in thermal contact with said secondary heat exchange chamber.

2. The invention of claim 1 wherein said thermoelectric module comprises a substantially flat member having a first substantially flat thermal transfer surface in thermal contact with said fuel heat exchange chamber and an opposite substantially flat thermal transfer surface in thermal contact with said secondary heat exchange chamber.

3. The invention of claim 1 wherein said thermoelectric module comprises a plurality of Peltier-effect thermoelectric modules.

4. The invention of claim 1 wherein said thermoelectric module comprises a Peltier-effect DC operated bi-directional thermoelectric device.

5. The invention of claim 1 further including a temperature sensor in thermal contact with fluid flowing through said fuel heat exchange chamber for generating a fuel temperature signal.

6. The invention of claim 5 wherein said temperature sensor is positioned adjacent said fuel outlet.

7. The invention of claim 1 wherein said fuel temperature control device includes a first housing member having said fuel inlet and said fuel outlet and a partially enclosed volume therebetween, and a second housing member having a base portion and a plurality of heat exchange surfaces extending from said base portion and received within said partially enclosed volume, said base portion having an outer surface coupled to said thermoelectric module.

8. The invention of claim 7 wherein said fuel temperature control device includes a third housing member having said secondary fluid inlet and said secondary fluid outlet and an additional partially enclosed volume therebetween, and a fourth housing member having a base and a plurality of heat exchange surfaces extending from said base portion and received within said additional partially enclosed volume, said secondary base portion having an outer surface coupled to said thermoelectric module.

9. The invention of claim 8 wherein said thermoelectric module is positioned between the outer surfaces of the base portions of said second and fourth housing members.

10. The invention of claim 9 further including a spacer member positioned between the base portions of said second and fourth housing members.

11. A fuel temperature control system for maintaining the temperature of the fuel within a predetermined range, said system comprising:

a fuel source;

a fuel distributing device;

a fuel temperature control device coupled between said fuel source and said fuel distributing device, said fuel temperature control device having a fuel inlet coupled to said fuel source and a fuel outlet coupled to said fluid distributing device, a fuel heat exchange chamber, a secondary fluid heat exchange chamber and a thermoelectric module in thermal contact with the two heat exchange chambers for transferring heat between said two chambers to maintain fuel flowing through the fuel heat exchange chamber within a predetermined temperature range, said thermoelectric module having a first thermal transfer surface in thermal contact with said fuel heat exchange chamber and a second thermal transfer surface in thermal contact with said secondary heat exchange chamber; and control means for supplying control signals to said thermoelectric module for regulating the amount and direction of heat flow therethrough.

12. The invention of claim 11 further including a temperature sensor in thermal contact with fluid flowing through said fluid heat exchange chamber for supplying fuel temperature signals to said control means.

13. The invention of claim 12 wherein said temperature sensor is positioned adjacent said fuel outlet.

14. The invention of claim 11 further including a secondary fluid inlet and a secondary fluid outlet coupled to said secondary fluid heat exchanger chamber.

15. The invention of claim 14 wherein said fluid distribution device comprises a fuel injection unit having a fuel inlet coupled to the fuel outlet of said fuel temperature control device and a fuel outlet coupled to said secondary fluid inlet of said fuel temperature control device, and wherein said secondary fluid outlet is coupled as a return path to said fuel source.

16. The invention of claim 11 wherein said thermoelectric module comprises a substantially flat member having a first substantially flat thermal transfer surface in thermal contact with said fuel heat exchange chamber and an opposite substantially flat thermal transfer surface in thermal contact with said secondary fluid heat exchanger.

17. The invention of claim 11 wherein said thermoelectric module comprises a plurality of Peltier-effect thermoelectric devices.

18. The invention of claim 11 wherein said thermoelectric module comprises a DC operated bi-directional Peltier-effect device.

19. The invention of claim 11 wherein said fuel temperature control device includes a first housing member having said fuel inlet and said fuel outlet and a partially enclosed volume therebetween, and a second housing member having a base portion and a plurality of heat exchange surfaces extending from said base portion and received within said partially enclosed volume, said base portion having an outer surface coupled to said thermoelectric module.

20. The invention of claim 19 wherein said fuel temperature control device includes a third housing member having a secondary fluid inlet and a secondary fluid outlet and an additional partially enclosed volume therebetween, and a fourth housing member having a base and a plurality of heat exchange surfaces extending from said base portion and received within said additional partially enclosed volume, said secondary base portion having an outer surface coupled to said thermoelectric module.

21. The invention of claim 20 wherein said thermoelectric module is positioned between the outer surfaces of the base portions of said second and fourth housing members.

* * * * *